United States Patent Office 3,472,883
Patented Oct. 14, 1969

3,472,883
PROCESS FOR PREPARING ESTREN-3-ONES
Gunther Kruger, St. Laurent, Montreal, Canada, assignor to American Home Products Corporation, New York, N.Y., a corporation of Delaware
No Drawing. Filed July 5, 1967, Ser. No. 651,131
Int. Cl. C07c *167/00, 169/10;* A61k *27/00*
U.S. Cl. 260—397.3                              6 Claims

ABSTRACT OF THE DISCLOSURE

There is disclosed herein a process for preparing 17β-hydroxy-4- and 5(10)-estren-3-ones and their 17-acylates, 4- and 5(10) - estren - 3,17-diones, 17β-hydroxy-4,6-estradien-3-one and its 17-acylates and 4,6-estradiene-3,17-dione, comprising heating 19-hydroxyandrost-4-ene-3,17-dione to yield 4- and 5(10)-estrene-3,17-dione, or 19-hydroxyandrosta-4,6-diene-3,17-dione to yield 4,6- and 5(10),6 - estradiene - 3,17-dione, or 17β-19-dihydroxy-androst-4-en-3-one to yield 19-nortestosterone, or 17β,19-dihydroxyandrosta-4,6-dien-3-one, to yield 6-dehydro-19-nortestosterone. Heating is carried out at temperatures between 80° C. and 600° C., preferably under reduced pressure and in the presence or absence of a solvent.

---

The present invention relates to a new and improved process for preparing 17β-hydroxy-4- and 5(10)-estren-3-ones and their 17-acylates, 4- and 5(10)-estren-3,17-diones, 17β - hydroxy - 4,6-estradien-3-one and its 17-acylates and 4,6-estradiene-3,17-dione.

17β - hydroxy - 4-estren-3-one (also called 19-nor-testosterone) and its 17-acylates are powerful anabolic agents with a more favourable ratio of anabolic to androgenic activity than the corresponding testosterone derivatives, while 4- and 5(10)-estrene-3,17-dione and 4,6-estradiene-3,17-dione are useful as intermediates for the preparation of estrogenic and antiestrogenic agents. For example, 5(10)-estren-3,17-dione is a useful intermediate for the preparation of 4,9(10)-estradien-3-ones of high antiestrogenic activity (see M. Perelman et al., J. Am. Chem. Soc., vol. 82, p. 2402 (1960); 4-estrene-3,17-dione may easily be converted to 17α-ethinyl-19-nortestosterone, the well-known drug Norethisterone; and 4,6-estradiene-3,17-dione may be converted to equilin, a powerful naturally occurring estrogen, by the methods described by Zderic et al. in J. Am. Chem. Soc., vol. 80, p. 2596 (1958) and in Steroids, vol. 1, p. 233 (1963).

Previously, 4- and 5(10)-estren-3-ones have been prepared by reduction of the aromatic 3-hydroxy-1,3,5(10)-estratriene derivatives, or by reduction of 10-acetoxy-4-estren-3-ones, or by decarboxylation or decarbonylation of Δ⁴-3-ketone 19-carboxylic acids or aldehydes. The above starting materials are not easily available.

It is a particular particular advantage of my invention that it permits the preparation of 19-nortestosterone and of its 17-acylates from easily available starting materials such as, for example, dehydroisoandrosterone which is easily converted to a 19-hydroxylated derivative suitable as starting material for my process.

In particular, I prefer to use 19-hydroxyandrost-4-ene-3,17-dione, which is easily available from dehydroiso-androsterone, for example by the method described by K. Heusler et al. in Experientia, vol. 18, p. 464 (1962). Heating of the former compound at temperatures between 80 and 600° C. in absence or presence of a solvent, such as, for example, triethylene glycol, paraffin or dimethyl-formamide yields a mixture of 4- and 5(10)-estrene-3,17-dione; treatment of 5(10)-estrene-3,17-dione with acid yields readily additional 4-estrene-3,17-dione.

In a similar manner, 19-hydroxyandrosta-4,6-diene-3,17-dione yields, upon heating under the conditions specified above, a mixture of 4,6- and 5(10),6-estradiene-3,17-dione; treatment of 5(10),6-estradiene-3,17-dione with acid yields readily additional 4,6-estradiene-3,17-dione.

The corresponding 17β-hydroxy derivatives may also be used as starting materials. Thus, 17β,19-dihydroxy-androst-4-en-3-one, when treated as described above yields 19-nortestosterone, while 17β,19-dihydroxyandrosta-4,6-dien-3-one yields 6-dehydro-19-nortestosterone similarly.

The ratio of Δ⁵⁽¹⁰⁾-3-ketones to Δ⁴-3-ketones formed on heating depends on the reaction conditions. Thus very little of Δ⁵⁽¹⁰⁾-3-ketones are present when the heating is carried out in presence of solvents or when the starting materials are distilled repeatedly.

The following formulae in which R represents O(ketonic oxygen) or the groups

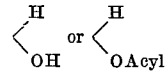

and examples will illustrate my invention.

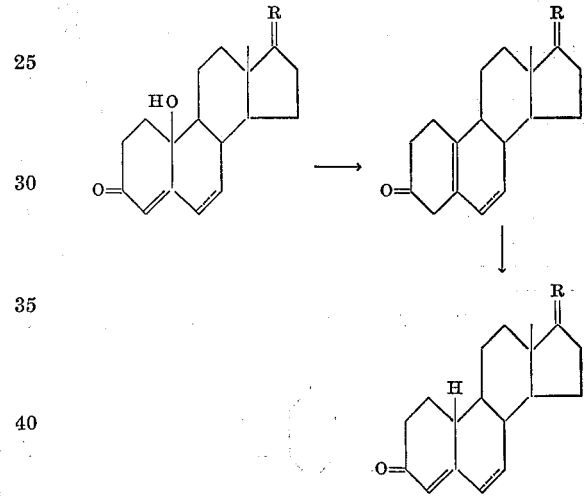

It is probable that the pyrolysis proceeds with liberation of formaldehyde and by retroaldolisation which would necessitate that initially Δ⁵⁽¹⁰⁾-3-ketones are formed, which then during the heating conjugate to the isomeric Δ⁴-3-ketones. An entirely analogous mechanism has recently been proposed by S. H. Eggers, Tetrahedron Letters, No. 12, p. 733 (1965) for the decomposition of 19-hydroxy-Δ⁴-3-ketones on electron impact during mass spectrometric analysis.

EXAMPLE 1

19-hydroxyandrost-4-ene-3,17-dione is distilled at 340° C. at a pressure of less than 1 mm. Hg. The crude pyrolysate is chromatographed on silica gel yielding 4-estrene-3,17-dione and 5(10)-estrene-3,17-dione, both compounds being identical with authentic samples. Treatment of the 5(10)-estrene-3,17-dione with a small amount of hydrochloric acid in tetrahydrofuran gives additional amounts of 4-estrene-3,17-dione.

EXAMPLE 2

17β,19-dihydroxyandrost-4-en-3-one is repeatedly distilled at 180° C. at a pressure of less than 1 mm. Hg. Recrystallization from methanol-ether yields 19-nortestosterone having an infrared spectrum identical with that of an authentic sample.

EXAMPLE 3

19-hydroxyandrosta-4,6-diene-3,17-dione is distilled at 180° and less than 1 mm. Hg. Chromatography on silica gel yields 5(10),1-estradiene-3,17-dione, $\lambda_{max}$ 272 m$\mu$, and 4,6-estradiene-3,17-dione on elution with benzene-ethyl acetate 4:1, $\lambda_{max}$ 284, M.P. 181–183° C. Brief treatment of 5(10),6-estradiene-3,17-dione in methanol with a trace of hydrochloric acid yields additional 4,6-estradiene-3,17-dione.

EXAMPLE 4

A mixture of 1 g. of 19-hydroxyandrosta-4,6-diene-3,17-dione and 30 g. of 4–6 mesh boiling stones is heated at 180° and less than 1 mm. Hg. The distillate of crude 4,6-estradiene-3,17-dione is recrystallized from ethyl acetate yielding the pure sample, M.P. 182–184° C., having an infrared spectrum identical with that of an authentic sample.

EXAMPLE 5

A solution of 1 g. of 19-hydroxyandrosta-4,6-diene-3,17-dione in 20 ml. of dimethylformamide is heated at 130° C. for 18 hours under nitrogen. Evaporation at reduced pressure followed by chromatography on silica gel yields 4,6-estradiene-3,17-dione on elution with benzene-ethylacetate 4:1.

EXAMPLE 6

A solution of 2 g. of 17β,19-dihydroxyandrosta-4,6-diene-3,17-dione in 40 ml. of dimethylformamide is refluxed for 18 hours in an atmosphere of nitrogen. Evaporation at reduced pressure followed by chromatography on silica gel, elution with ethyl acetate-benzene 1:1 and recrystallization from ethyl acetate gives 6-dehydro-19-nortestosterone, M.P. 181–182° C., having an infrared spectrum identical with that of an authentic sample.

EXAMPLE 7

17β,19-dihydroxyandrosta-4,6-dien-3-one is repeatedly distilled at 180° C. and less than 1 mm. Hg. Recrystallization of the distillate with ethyl acetate gives 6-dehydro-19-nortestosterone, M.P. 181–182° C.

I claim:
1. The process of preparing a compound of the formula

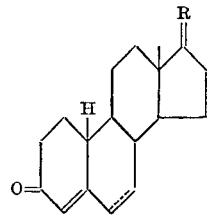

wherein R is selected from the group which consists of ketonic oxygen, the grouping

and the grouping

wherein Q represents an acyl radical, which comprises subjecting a starting material of the formula

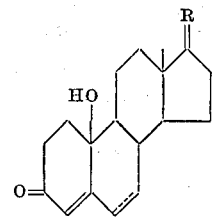

wherein R has the above identified significance to repeated distillation at a temperature between 80° C. and 600° C. at a reduced pressure, less than atmospheric, of about 1 millimeter of mercury, thereby securing an intermediate product, and then treating said intermediate product with a methanolic solution of a mineral acid, thereby securing as final product a compound of said specified formula.

2. The process as claimed in claim 1 wherein said methanolic solution of a mineral acid is a solution of hydrochloric acid in methanol.

3. The process as claimed in claim 1 wherein said starting material is 19-hydroxyandrost-4-ene-3,17-dione and said final product is 4-estrene-3,17 dione.

4. The process as claimed in claim 1 wherein said starting material is 19-hydroxyandrosta-4,6-diene-3,17-dione and said final product is 4,6-estradiene-3,17-dione.

5. The process as claimed in claim 1 wherein said starting material is 17β,19-dihydroxyandrosta-4-en-3-one and said final product is 19-nortestosterone.

6. The process as claimed in claim 1 wherein said starting material is 17β,19-dihydroxyandrosta-4,6-dien-3-one and said final product is 6-dehydro-19-nortestosterone.

References Cited
UNITED STATES PATENTS

| | | | |
|---|---|---|---|
| 3,013,025 | 12/1961 | Zaffaroni | 260—397.1 |
| 3,278,528 | 10/1966 | Bowers et al. | 260—239.55 |
| 3,340,278 | 9/1967 | Kruger | 260—397.3 |

LEWIS GOTTS, Primary Examiner

E. G. LOVE, Assistant Examiner

U.S. Cl. X.R.

260—397.4, 999

PO-1050
(5/69)

UNITED STATES PATENT OFFICE
CERTIFICATE OF CORRECTION

Patent No. 3,472,883                 Dated October 14, 1969

Inventor(s) Gunther Kruger

It is certified that error appears in the above-identified patent and that said Letters Patent are hereby corrected as shown below:

Column 2, first formula, lines 22 to 32, reading:

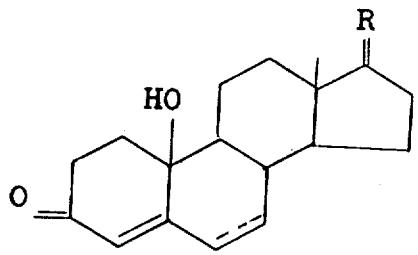

should read:

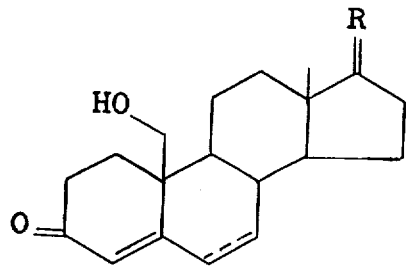

SIGNED AND
SEALED
FEB 24 1970

(SEAL)
Attest:

Edward M. Fletcher, Jr.
Attesting Officer

WILLIAM E. SCHUYLER, JR.
Commissioner of Patents